UNITED STATES PATENT OFFICE.

DAVID J. GUE AND JOSEPH C. GRANT, OF NEW YORK, N. Y., ASSIGNORS TO THEMSELVES AND JACOB SWIVEL, OF SAME PLACE.

EXTRACT OF COFFEE.

SPECIFICATION forming part of Letters Patent No. 229,697, dated July 6, 1880.

Application filed May 13, 1880. (No specimens.)

*To all whom it may concern:*

Be it known that we, DAVID J. GUE and JOSEPH C. GRANT, both citizens of the United States, residing in the city, county, and State of New York, jointly have invented a new and Improved Fluid Extract of Coffee, constituting a new article of manufacture, of which the following is a specification.

Our invention is based upon an application for Letters Patent of the United States filed September 17, 1879, of which this constitutes a division.

The object of our invention is to furnish to consumers a liquid extract of coffee containing all the aromatic and valuable qualities of the berry, and adapted to be used simply by the addition of hot water, sugar, or milk, or two or all of these, according to taste.

It is well known that coffee when ground rapidly loses its aroma, and when boiled or steeped parts with that quality still more rapidly and soon becomes insipid, or a decoction containing simply the bitter principles of the berry without the finer qualities which are imparted to the coffee by the fragrant volatile oils of the berry.

In order to carry out our invention in the best way now known to us we first roast and grind the coffee, and then make a fluid extract thereof by repeated infusions or repercolations in cold water by the well-known Squibbs process, or by macerating the coffee with cold water and subjecting it to pressure in well-known ways. By this process the caffeine and volatile oils and other easily-soluble properties or constituents are extracted without being impaired by heat, and in a condition to retain their valuable qualities.

The grounds or residuum left after this process are boiled or steeped in hot water, using a quantity of the latter sufficient simply to prevent the scorching of the product, which boiling process removes all the bitter principles and other valuable constituents that are not soluble in cold water, and which are essential to the production of a perfect extract. The liquid is then drawn off from the grounds either with or without pressure in well-known ways, and preferably allowed to cool. The two extracts are then mingled together. The mixture thus made contains all the valuable and essential qualities of the berry and requires only the addition of boiling water to make a strong highly-flavored drink, which mixture also will but slowly lose its volatile properties or qualities if exposed to air.

One process of preparing this article is set forth in the application above mentioned, of which this is a division; but the process itself, the proportions of the ingredients, and the length of treatment may be varied within certain limits without materially affecting the result produced, such variations being in fact unavoidable in preparing the product, owing to the varying conditions of the different grades of coffee.

We claim—

As a new article of manufacture, fluid extract of coffee, substantially such as herein set forth, consisting of a mixture of a cold infusion of the berry primarily obtained, with a cooled decoction of the residuum of the infusion, in which extract is retained the caffeine, volatile oils, and other soluble constituents, with the astringent and bitter principle.

In testimony whereof we have hereunto set our hands this 11th day of May, 1880.

DAVID J. GUE.
JOSEPH C. GRANT.

Witnesses:
H. HOUGHTON,
E. C. DAVIDSON.